(12) United States Patent
Toland

(10) Patent No.: US 8,691,575 B2
(45) Date of Patent: Apr. 8, 2014

(54) GENERAL METHOD OF CLASSIFYING PLANT EMBRYOS USING A GENERALIZED LORENZ-BAYES CLASSIFIER

(75) Inventor: Mitchell R. Toland, Puyallup, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 2479 days.

(21) Appl. No.: 10/932,481

(22) Filed: Sep. 2, 2004

(65) Prior Publication Data

US 2005/0069176 A1 Mar. 31, 2005

Related U.S. Application Data

(60) Provisional application No. 60/507,631, filed on Sep. 30, 2003.

(51) Int. Cl.
*C12N 5/00* (2006.01)

(52) U.S. Cl.
USPC ............. 435/410; 435/420; 435/421; 702/19; 702/22; 702/30; 702/32; 47/1.01 R

(58) Field of Classification Search
USPC .......... 435/410, 420, 421; 47/1.01 R; 702/19, 702/22, 30, 32
See application file for complete search history.

(56) References Cited

U.S. PATENT DOCUMENTS

| | | |
|---|---|---|
| 5,181,259 A | 1/1993 | Rorvig |
| 5,183,757 A | 2/1993 | Roberts |
| 5,464,769 A | 11/1995 | Attree et al. |
| 5,680,320 A | 10/1997 | Helmer et al. |
| 5,784,162 A | 7/1998 | Carib et al. |
| 5,842,150 A | 11/1998 | Renberg et al. |
| 5,930,803 A | 7/1999 | Becker et al. |
| 5,960,435 A | 9/1999 | Rathmann et al. |
| 6,021,220 A | 2/2000 | Anderholm |
| 6,092,059 A | 7/2000 | Straforini et al. |
| 6,567,538 B1 | 5/2003 | Pelletier |
| 6,582,159 B2 | 6/2003 | McKinnis |
| 2002/0192686 A1 | 12/2002 | Adorjan et al. |
| 2003/0055615 A1 | 3/2003 | Zhang et al. |

FOREIGN PATENT DOCUMENTS

WO WO 99/63057 A1 12/1999

OTHER PUBLICATIONS

Hajmeer MN, "A hybrid Bayesian-neural network approach for probabilistic modeling of bacterial growth/no growth interface," *Int J of Food Micro* 82 (2003) pp. 253-243.

Hajmeer M, "A probabilistic neural network approach for modeling and classification of bacterial growth/no growth data," *J of Microb Methods* 51(2002) pp. 217-226.

Parzen E, "On estimation of a probability density function and mode," *The Annals of Mathematical Statistics*, vol. 33, No. 3 (1962), pp. 1065-1076.

Timmis R et al, "Use of Visible and Near Infrared Reflectance Spectra for Selection of Germination-Competent Somatic Embryos," *Tree Biotechnology 2003*, Abstract and Poster, Sweden, Jun. 2003.

Cheng, Z., and P.P. Ling, "Machine Vision Techniques for Somatic Coffee Embryo Morphological Feature Extraction," *American Society of Agricultural Engineers* 37(5):1663-1669, 1994.

Chi, C.-M., et al., "An Advanced Image Analysis System for Evaluation of Somatic Embryo Development," *Biotechnology and Bioengineering* 50:65-72, Apr. 1996.

Grob, J.A., et al., "Dimensional Model of Zygotic Douglas-Fir Embryo Development," *Int. J. Plant Sci.* 160(4):653-662, 1999.

Timmis, R., "Bioprocessing for Tree Production in the Forest Industry: Conifer Somatic Embryogenesis," *Biotechnology Progress* 14(1):156-167, Feb. 1998.

*Primary Examiner* — Blaine Lankford
(74) *Attorney, Agent, or Firm* — Christensen O'Connor Johnson Kindness PLLC

(57) ABSTRACT

A method of classifying plant embryos according to their quality based on a general form of Lorenz-Bayes classifier is disclosed. First, image or spectral data of plant embryos of known quality are acquired, and the data are divided into two classes according to the embryos' known quality. Second, metrics are calculated from the acquired image or spectral data in each class. Third, multi-dimensional histograms of multiple metrics are prepared for both classes. Fourth, the difference or some other measure of comparison between the two multi-dimensional histograms is obtained. Fifth, image or spectral data of a plant embryo of unknown quality are obtained and metrics are calculated therefrom. Sixth, the embryo of unknown quality is assigned to a class based on its calculated metrics and the result of the comparison as calculated in the fourth step above.

10 Claims, 8 Drawing Sheets

| METRIC A | "GOOD" EMBRYOS | "BAD" EMBRYOS |
|---|---|---|
| 1 | 40% | 80% |
| 2 | 60% | 90% |
| 3 | 80% | 95% |
| 4 | 82% | 96% |
| 5 | 83% | 97% |
| ⋮ | ⋮ | ⋮ |

| ID | METRIC A | METRIC B | EMBRYOS (TRAINING SET) | | |
|---|---|---|---|---|---|
| L | Y | Y | G | G | B |
| M | Y | N | G | G | |
| N | N | Y | G | | |
| O | N | N | B | B | B |

| ID | METRIC A | METRIC B | EMBRYOS (TRAINING SET) | | | |
|---|---|---|---|---|---|---|
| L | Y | | G | B | G | G | G |
| M | N | | B | B | B | G | |

*Fig. 3C*

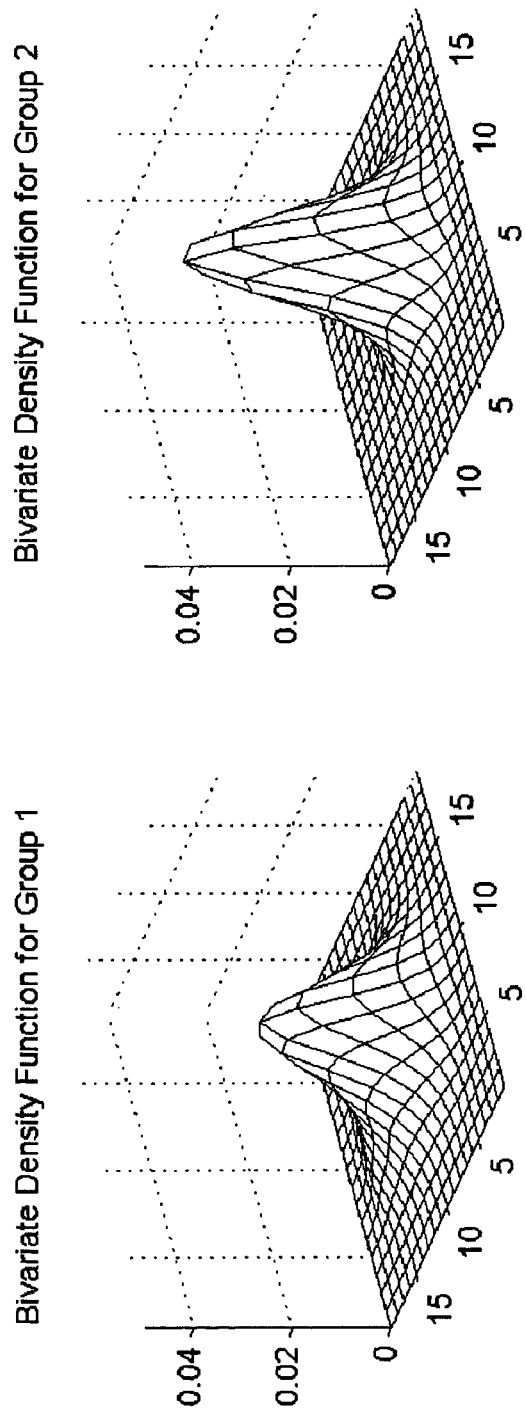

GENERAL METHOD OF CLASSIFYING PLANT EMBRYOS USING A GENERALIZED LORENZ-BAYES CLASSIFIER

This application is a utility claiming the benefit of U.S. Provisional Application No. 60/507,631, filed Sep. 30, 2003.

FIELD OF THE INVENTION

The invention is directed to classifying plant embryos to identify those embryos that are likely to successfully germinate and grow into normal plants, and more particularly, to a method for classifying plant embryos according to their quality using a generalized form of a Lorenz-Bayes classifier, also known as a Parzen classifier or Parzen-Bayes classifier (see Keinosuke Fukunaga, *Statistical Pattern Recognition*, Academic Press, 1990).

BACKGROUND OF THE INVENTION

Reproduction of selected plant varieties by tissue culture has been a commercial success for many years. The technique has enabled mass production of genetically identical selected ornamental plants, agricultural plants, and forest species. The woody plants in this last group have perhaps posed the greatest challenges. Some success with conifers was achieved in the 1970s using organogenesis techniques wherein a bud, or other organ, was placed on a culture medium where it was ultimately replicated many times. The newly generated buds were placed on a different medium that induced root development. From there, the buds having roots were planted in soil.

While conifer organogenesis was a breakthrough, costs were high due to the large amount of handling needed. There was also some concern about possible genetic modification. It was a decade later before somatic embryogenesis achieved a sufficient success rate so as to become the predominant approach to conifer tissue culture. With somatic embryogenesis, an explant, usually a seed or seed embryo, is placed on an initiation medium where it multiplies into a multitude of genetically identical immature embryos. These can be held in culture for long periods and multiplied to bulk up a particularly desirable clone. Ultimately, the immature embryos are placed on a development medium where they are intended to grow into somatic analogs of mature seed embryos. As used in the present description, a "somatic" embryo is a plant embryo developed by the laboratory culturing of totipotent plant cells or by induced cleavage polyembryogeny, as opposed to a zygotic embryo, which is a plant embryo removed from a seed of the corresponding plant. These embryos are then individually selected and placed on a germination medium for further development. Alternatively, the embryos may be used in artificial seeds, known as manufactured seeds.

There is now a large body of general technical literature and a growing body of patent literature on embryogenesis of plants. Examples of procedures for conifer tissue culture are found in U.S. Pat. Nos. 5,036,007 and 5,236,841 to Gupta et al.; U.S. Pat. No. 5,183,757 to Roberts; U.S. Pat. No. 5,464,769 to Attree et al.; and U.S. Pat. No. 5,563,061 to Gupta. Further, some examples of manufactured seeds can be found in U.S. Pat. No. 5,701,699 to Carlson et al., the disclosure of which is hereby expressly incorporated by reference. Briefly, a typical manufactured seed is formed of a seed coat (or a capsule) fabricated from a variety of materials such as cellulosic materials, filled with a synthetic gametophyte (a germination medium), in which an embryo surrounded by a tube-like restraint is received. After the manufactured seed is planted in the soil, the embryo inside the seed coat develops roots and eventually sheds the restraint along with the seed coat during germination.

One of the more labor intensive and subjective steps in the embryogenesis procedure is the selective harvesting from the development medium of individual embryos suitable for germination (e.g., suitable for incorporation into manufactured seeds). The embryos may be present in a number of stages of maturity and development. Those that are most likely to successfully germinate into normal plants are preferentially selected using a number of visually evaluated screening criteria. A skilled technician evaluates the morphological features of each embryo embedded in the development medium, such as the embryo's size, shape (e.g., axial symmetry), cotyledon development, surface texture, color, and others, and selects those embryos that exhibit desirable morphological characteristics. This is a highly skilled yet tedious job that is time consuming and expensive. Further, it poses a major production bottleneck when the ultimate desired output will be in the millions of plants.

It has been proposed to use some form of instrumental image analysis for embryo selection to supplement or replace the visual evaluation and classification described above. For example, International Patent Application No. PCT/US99/12128 (WO 99/63057), explicitly incorporated by reference herein, discloses a method for classifying somatic embryos based on images of embryos or spectral information obtained from embryos. Generally, the method develops a classification model (or a "classifier") based on the digitized images or NIR (near infrared) spectral data of embryos of known embryo quality (e.g., potential to germinate and grow into normal plants, as validated by actual planting of the embryos and a follow-up study of the same or by the morphological comparison to normal zygotic embryos). A "classifier" is a system that identifies an input by recognizing that the input is a member of one of a number of possible classes. The classifier in this case is thus applied to an image or spectral data of an embryo of unknown quality to classify the embryo according to its embryo quality.

Various classification models, or classifiers, are available, such as Fisher's linear and quadratic discriminant functions, classification trees, k-nearest-neighbors clustering, neural networks, and SIMCA. All of these models have been successfully used in many applications, but have been found to perform below expectations when classifying embryos because they either fail to be fast enough or the data from the embryos do not meet the requirements for these classifiers to work.

Fisher's linear discriminant function basically rotates data until it finds the best straight dividing line between groups, assuming that the original data have a Gaussian distribution (i.e., bell-shaped curve). Fisher's quadratic discriminant function is the same, except that it allows for a curved dividing line. Data from embryos are not from a Gaussian distribution and often the boundaries between groups are not straight lines or simple curves, so these two methods do not always work well.

Classification trees divide data into many little blocks or categories. At first, all of the data are divided into two blocks, and then each of these blocks is further divided, and so on. Each block is divided in a way that makes the data in each smaller block more homogenous in the sense that the data points are close together geometrically or the data values are more similar. This method has not worked well for embryo classification using measures of data homogeneity, and it fails using probabilities because it does not always leave enough data points in some blocks so that the probabilities can be estimated well. Also, this method uses many straight lines to approximate curved boundaries between groups. As a result, the misclassification error rate has gone up because of the stair-step nature of the resulting classification boundary.

K-nearest-neighbors clustering classifies embryos by finding how much the statistics from a new embryo image differs from those of previous embryo images whose quality is known. Which class has the majority of the k closest points determines the classification of the new embryo. This is a very simple method but can be very slow in practice because all of the differences between the statistics from the new embryo and all of the statistics of the embryos in the library (i.e., the embryos of known quality) must be calculated. Thus, the method is not suitable for rapidly classifying embryos, for example, at the rate of several embryos per second.

Neural networks classify embryos by finding a lot of functions which are combined into a single curved boundary that best divide the data into desired groups. The difficulty is in determining how many functions are needed and estimating the coefficients in these functions. Often, a lot of work and time are required to find such a combined model. Classification of a new embryo occurs by passing its statistics to the combined model and calculating its group membership. The difficulty in finding the combined model, as well as the sensitivity of the model to how well the original training data represent all future data, limit the application of this method.

SIMCA is a classification method originally developed for classifying chemicals. For each group, principal components are calculated based on statistics. A new embryo is classified by determining which group's principal components best predict the values of the embryos' statistics. It works well, but requires a lot of data preparation. The additional data preparation will make this method too slow in a production environment.

Additionally, PCT/US99/12128 (WO 99/63057), incorporated above, discloses an embryo classifier using a Lorenz curve and a Bayes optimal classifier, termed "Lorenz-Bayes" classifier, to be described in detail below. While this method has been successful in rapidly and accurately classifying embryos according to their embryo quality, there is a continuing need to further increase the classification speed and accuracy in order to achieve mass classification required for mass production of manufactured seeds. The present invention addresses this continuing need.

SUMMARY OF THE INVENTION

The present invention is directed to classification of plant embryos by the application of classification algorithms to digitized images and/or data relating to or based on the absorption, transmittance, reflectance, or excitation spectra of the embryos. The images may also be of absorbed, transmitted, reflected, or excitation energy. While the classification methods of the invention are applied to image and spectral information acquired from embryos, the invention is not concerned with or limited to any particular method of acquiring image or spectral information. In fact, the methods may be applied to image and spectral information acquired based on a variety of technologies, which are available at the present time and may be developed in the future, including relatively more complex technologies such as multi-viewpoint imaging (e.g., imaging a top view, side view, and end view of an embryo), imaging in color, imaging using non-visible portions of the electromagnetic spectrum, imaging using fluorescent proteins and/or quantum dots makers of specific molecules, and imaging using energy input to embryos to get certain molecules, tissues, or organs to emit particular energies that can be detected. Image or spectral data may be obtained from whole plant embryos or any portion(s) thereof.

A method first develops a classification model by acquiring raw digital image or spectral data of reference samples of plant embryos of known embryo quality. The embryo quality of the reference samples may be determined based on the embryo's conversion potential, resistance to pathogens, drought resistance, and the like, as validated by actual planting of the embryos and a follow-up study of the same, or by morphological comparison of the embryos to normal zygotic embryos. Optionally, the raw digital or spectral data may be preprocessed using one or more preprocessing algorithms to reduce the amount of raw image or spectral data; then one or more "metrics" are calculated from the raw digital or spectral data, or from the preprocessed data.

"Metrics" may be any quantifiable attribute or statistical values that capture some information about an embryo including, but not limited to, geometric values (length, height, perimeter distance, area enclosed by the perimeter, etc., of an embryo), color or texture related values, and spectral values (absorption, transmittance, or reflectance at discrete wavelengths, etc.).

In the previous Lorenz-Bayes classifier, briefly introduced above, for each type of metric value, the calculated metric values are then divided into two groups based on the known embryo quality. For example, metric values calculated from the embryos of known high quality are included in one class, while metric values calculated from the embryos of known low quality are included in another class. For each of these metric values, the fraction of metric values less than or equal to that metric value is recorded for each embryo quality class, to thereby obtain two cumulative distribution curves (one for high-quality embryo class, and the other for low-quality embryo class). Plotting these two sets of fractions against each other constitutes a Lorenz curve. A point on the curve farthest away from the line $y=x$ is defined as the balance point, and a metric corresponding to the balance point is defined as the threshold value. A plurality of threshold values are obtained for plural types of metrics values in this manner. The plurality of threshold values are then combined using a Bayes optimal classifier to form a single classifier (i.e., classification model).

The present invention offers a generalized form of the Lorenz-Bayes classifier, which significantly speeds up the classification process, is robust, and can handle nonlinear boundaries which often exist in embryo data, thereby increasing the accuracy of the classifications. Specifically, a generalized Lorenz-Bayes based method of classifying plant embryos according to their quality includes the steps of:

(a) acquiring image or spectral data from plant embryos of known quality;

(b) dividing the acquired image or spectral data from embryos of known quality into two classes according to their known quality;

(c) calculating metrics based on the acquired image or spectral data in each class;

(d) calculating multi-dimensional density functions (e.g., as estimated by multi-dimensional histograms) for multiple metrics per each class;

(e) comparing the two multi-dimensional density functions calculated in step (d) by calculating a comparison value that is indicative of the relation between the two density functions, the comparison value being classifiable into at least two groups;

(f) acquiring image or spectral data from a plant embryo of unknown quality and calculating metrics based on the acquired image or spectral data; and (g) if the metrics of the embryo of unknown quality correspond to a comparison value of one group as calculated in step (e), assigning the embryo into one quality class, and if the metrics of the embryo of unknown quality correspond to a comparison value of another group as calculated in step (e), assigning the embryo into another quality class.

According to one aspect of the invention, prior to step (e) of comparing the two density functions, the density functions can be multiplied by weights (usually numbers between 0 and 1), which reflect differences in costs of misclassifying an embryo. For example, it costs more to produce a manufactured seed from a dead embryo and try to grow it in a nursery than it does to throw away an embryo that will grow properly. Multiplying the density functions by weights prior to comparing them will shift the classification decision toward the least costly decision. Other criteria can also be used as the basis of the weights. If no weights are specified, then one is implicitly using equal weights.

According to another aspect, a method of the present invention is implemented in the form of computer-executable instructions (software) running on a computer.

As will be apparent to one skilled in the art, the present method is a generalized version of the Lorenz-Bayes method previously disclosed, and includes the previously disclosed method as a special case. Unlike the previous method in which several univariate metrics (or threshold values corresponding to respective Lorenz curves) are calculated and combined, the generalized Lorenz-Bayes method applies the Lorenz concept to multivariate samples to determine multivariate Lorenz thresholds from multivariate density functions (or histograms). Thus, the generalized method greatly speeds up the process of finding a classifier and permits more rigorous testing of the accuracy of the derived classifier. Furthermore, unlike the previous method that uses only linear boundaries, the generalized method allows nonlinear boundaries between groups, and thus is capable of finding better classification models.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3C is a table for illustrating the application of a Bayes theorem to multivariate metrics threshold values obtained from the multivariate histograms of FIGS. 3A and 3B;

FIGS. 4A and 4B illustrate bivariate (two-variables) density functions for two embryo quality groups, respectively;

DETAILED DESCRIPTION OF THE PREFERRED EMBODIMENT

Figures 1A, 1B:
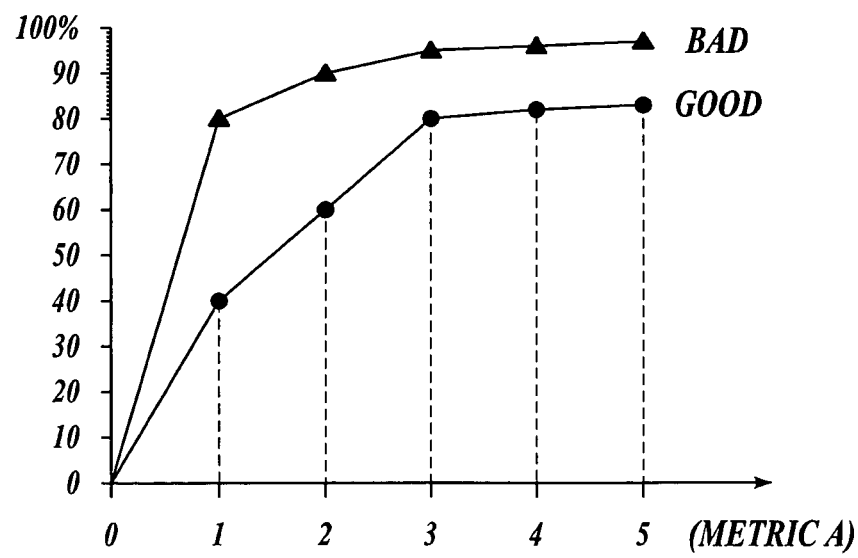
FIG. 1A is a table showing the cumulative distributions of embryos in two classes with respect to a single metric.
FIG. 1B shows two cumulative distribution curves for the two classes of embryos, plotted based on the table of FIG. 1A.

The methods of the present invention may be used to classify any type of plant embryos, including both zygotic and somatic embryos, according to their embryo quality. The embryo quality may be determined based on any criteria susceptible to characterization or quantification. For example, the embryo quality may be determined based on one or more criteria, such as the embryo's conversion potential (i.e., potential for germination and subsequent plant growth and development), resistance to pathogens, drought resistance, heat and cold resistance, salt tolerance, preference for (or indifference to) light quality, suitability for long term storage, and the like. As more information is known about plant embryos and their desirability, more criteria may be developed to further refine the selection process to identify only truly "high-quality" embryos with various desirable characteristics. For the purpose of the present description, however, it suffices to note that plant embryos are to be classified into two quality classes using any one or more of these classification criteria: a class of acceptable, relatively high-quality embryos, and another class of unacceptable, relatively low-quality embryos.

Embryos from all plant species may be classified using the methods of the present invention. The methods, however, have particular application to agricultural plant species where large numbers of somatic embryos are used to propagate desirable genotypes, such as forest tree species. Specifically, the methods can be used to classify somatic embryos from the conifer tree family Pinaceae, particularly from the genera: *Pseudotsuga* and *Pinus*.

As a preliminary step of the method, images or spectral data are obtained from plant embryos (or any portions thereof), using one or more views (top view, side view, end view, etc.) using any known or to-be-developed technology, such as an electronic camera containing a charge-coupled device (CCD) linked to a digital storage device. Spectrometric analysis of embryos can be performed using a data collection setup that includes, for example, a light source (e.g., NIR source), a microscope, a light sensor, and a data processor. Using such setup, embryos or embryo regions are scanned and spectral data are acquired regarding absorption, transmittance, reflectance, or excitation of electromagnetic radiation at multiple discrete wavelengths. Image data can also be acquired regarding absorption, transmittance, reflectance, or excitation of electromagnetic radiation at multiple discrete wavelengths. Further, images can be acquired of radiographic or fluorescent protein or quantum-dot chemical markers. Differences in spectral data collected from embryos of high quality versus those of low quality are presumed to reflect differences in chemical composition that are related to embryo quality. Any suitable data acquisition protocols can be used to specify embryo sampling methods, the amount of data required, or repeated measurement required to obtain data of sufficient quality, to make satisfactory classifications of the embryos.

Optionally, the acquired raw digital image or spectral data can be preprocessed using suitable preprocessing algorithms. Any such algorithms apparent to one skilled in the art may be used, for example, to remove background information (i.e., any data derived from non-embryo sources such as background light scatter or other noise), or to reduce the size of the digital or spectral data file. For example, U.S. Pat. No. 5,842,150 discloses that NIR spectral data can be preprocessed prior to multivariate analysis using the Kubelka-Munk transformation, the Multiplicative Scatter Correction (MSC), the Fourier transformation, or the Standard Normal Variate transformation, all of which can be used to reduce noise and adjust for drift and diffuse light scatter. As another example, the amount of digital data required to represent an acquired image or spectrum of an embryo can be reduced using interpolation algorithms, such as wavelet decomposition. See for example, Chui, C. K., *An Introduction to Wavelets*, Academic Press, San Diego, 1992; Kaiser, Gerald, *A Friendly Guide to Wavelets*, Birkhauser, Boston; and Strang, G. and T. Nguyen, *Wavelets and Filter Banks*, Wellesley-Cambridge Press, Wellesley, Mass. Wavelet decomposition has been used extensively for reducing the amount of data in an image, and for extracting and describing features from biological data. For example, wavelet techniques have been used to reduce the size of fingerprint image files to minimize computer storage requirements. As another example, a method has been developed to diagnose obstructive sleep apnea based on the wavelet composition of heart beat data. A variety of other interpolation methods can be used to similarly reduce the amount of data in an image or spectral data file, such as calculation of adjacent averages, Spline methods (see for example, C. de Boor, *A Practical Guide to Splines*, Springer-Verlag, 1978), Kriging methods (see for example, Noel A. C. Cressie, *Statistics for Spatial Data*, John Wiley, 1993), and other interpolation methods which are commonly available in software packages that handle images and matrices. The results from an interpolation algorithm or functions thereof are then used as inputs for calculating "metrics," described below.

"Metric" refers to any scalar statistical value calculated from image and/or spectral data that captures information such as geometric (size and shape), color, texture, or spectral features of an embryo. In other words, a metric is any attribute value that contains some quantifiable information about an embryo. In image processing language, sets of metrics are also known as feature vectors. As non-limiting examples, metrics include central and non-central moments, functions of the spectral energy at specific wavelengths, and any function of one or more of these statistics. For example, metrics may include any value related to the size (length, height, area, etc.), shape, color (RGB, hue, etc.), texture, etc., of an embryo. As a specific example, metrics related to the color of an embryo may include the mean standard deviation, coefficient of skewness, and coefficient of kurtosis for each color as well as hue, saturation, and intensity. Metrics related to the texture of an embryo may include detail coefficients and smooth coefficients. As a further specific example, a set of statistics may be calculated from the perimeter of an embryo and its wavelet decomposition, to produce metrics that quantify the shape information of an embryo. In addition, metrics can be derived from external considerations, such as embryo processing costs, embryo processing time, and the complexity of an assembly line required for sorting embryos by quality. In one embodiment, principal component analysis (PCA), well known in the art, may be applied to calculate metrics. For a given data set, PCA constructs a set of orthogonal vectors (principal components) which correspond to the directions of maximum variance in the data. Typically, 100 to 1,000 metrics may be calculated from each embryo's image or spectral data, although of course more or less number of metrics may be calculated depending on each application.

The classification model is deduced from a "training" data set of one or more images (or spectral data sets) of plant embryos or portions thereof having known embryo quality. Specifically, the embryos providing the training data set are classified as acceptable quality or unacceptable quality, based on one or more criteria as discussed above, according to morphological comparison to normal zygotic embryos or actual planting of the embryos and a follow-up study of the same. Morphological criteria may include, for example, the embryo's size, shape (e.g., axial symmetry), cotyledon development, surface texture, color, and others. As will be more fully described later, unclassified embryos will be classified as acceptable or not, based on how close image or spectral data from these unclassified embryos fit to the classification model developed from the training set data.

The classification model of the present invention employs multidimensional density functions and a Bayes optimal classifier, which is a generalized version of the previous method employing a Lorenz curve and a Bayes optimal classifier.

For a brief introduction to Lorenz curves, see Johnson, S. and N. L. Kotz, Eds. *Encyclopedia of Statistical Sciences*, John Wiley, vol. 5, pp. 156-161, 1985. Originally, the Lorenz curve was developed to compare income distribution among different groups of people. A Lorenz curve is created by plotting the cumulative fraction of income versus the cumulative fraction of the population that owns that cumulative fraction of the income. If the income is distributed equally among the people, the curve will coincide with the straight line $y=x$.

Figures 1C, 1D:
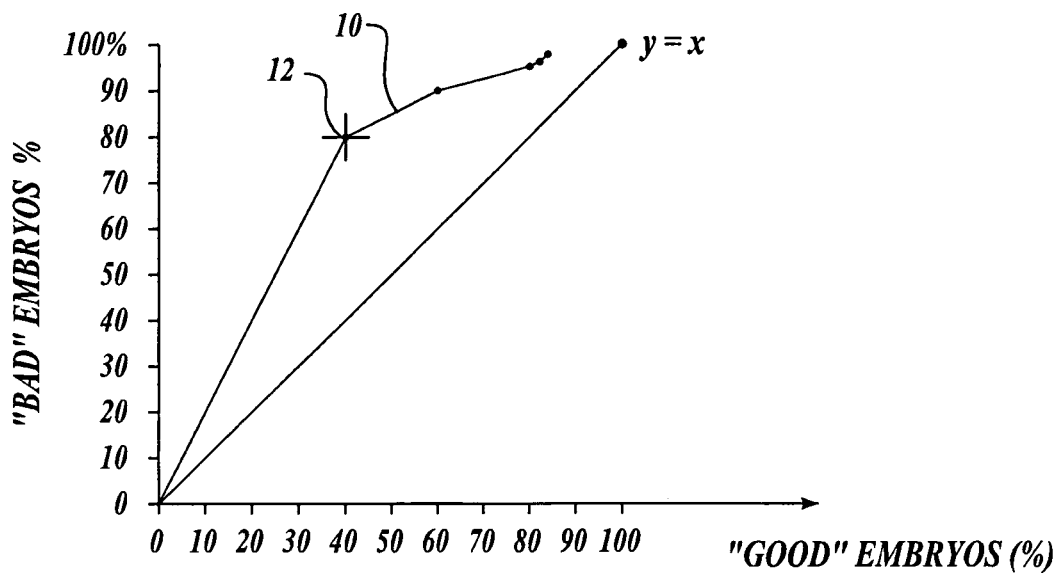
FIG. 1C illustrates a Lorenz curve plotting the two fractional distributions of FIG. 1A against each other, showing the concept of a Lorenz-based metric threshold value.
FIG. 1D is a table for illustrating the application of a Bayes theorem to combine multiple univariate metric threshold values obtained according to FIG. 1C.

In the previously described Lorenz-Bayes method of embryo classification, the Lorenz curve is used to compare two cumulative distribution functions, wherein the fractional values of one cumulative distribution function are plotted against the fractional values of the second cumulative distribution function. Specifically, for each of the calculated metric values, the fraction of metric values less than or equal to that metric value is recorded for each embryo quality class, to thereby obtain two cumulative distribution curves (one for high-quality embryo class, and the other for low-quality embryo class). This process is illustrated in reference to FIGS. 1A and 1B. FIG. 1A shows a certain metric A, having values ranging from 1, 2, 3, 4, 5, and so on. It is determined that 40% of the embryos having known good quality have a metric A value of 1 or less and that 60% of the embryos having known good quality have a metric A value of 2 or less, and so on, while 80% of the embryos having known bad quality have a metric A value of 1 or less and that 90% of the embryos having known bad quality have a metric A value of 2 or less. Plotting these two distributions for good-quality embryos and bad-quality embryos, respectively, will produce two distribution curves as shown in FIG. 1B. To compare these two distributions against each other, the fractional distributions are plotted against each other, as shown in FIG. 1C, to obtain a Lorenz curve 10. If the two distributions are the same, the Lorenz curve will plot the straight line $y=x$. In reality, though, the Lorenz curve is rarely the straight line $y=x$, as shown in FIG. 1C. The point 12 on the Lorenz curve that is farthest from the line $y=x$ corresponds to the balance point at which one distribution accumulates more probability than the other distribution. The absolute value of the difference between the cumulative distribution functions at this point is formally called the Smirnov statistic (see W. J. Conover, *Practical Nonparametric Statistics*, $2^{nd}$ Ed. John Wiley & Sons, 1980). In other words, the balance point 12 is an objective point that separates the two distributions. The metric value corresponding to this balance point is thus defined as a threshold value which separates embryos into two classes. This threshold value is called the Lorenz threshold (see Gabriel Katul and Brani Vidakovic, "*The Partitioning of Attached and Detached Eddy Motion in the Atmosphere Surface Layer Using Lorentz Wavelet Filtering*", Boundary Layer Meteorology, vol. 77, No. 2, pp. 153-172, 1996).

Figure 2B:
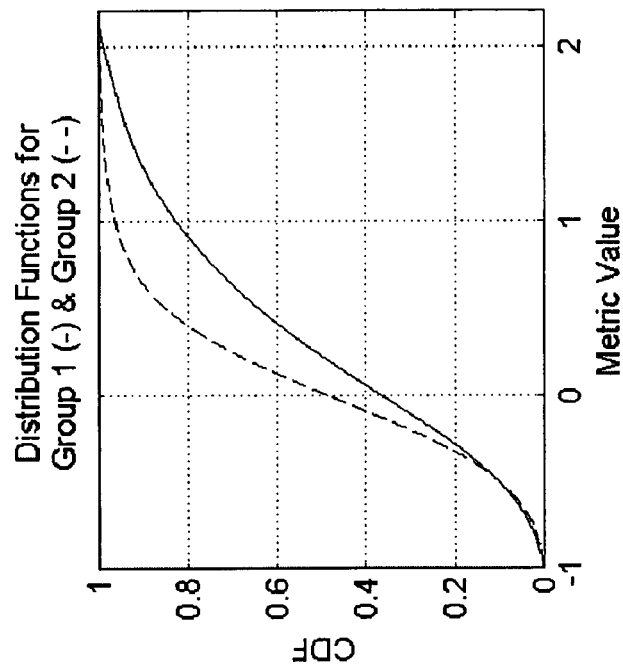
FIG. 2B shows the cumulative distribution functions for the two embryo quality groups, as shown in FIG. 2A, respectively.
Figure 2A:
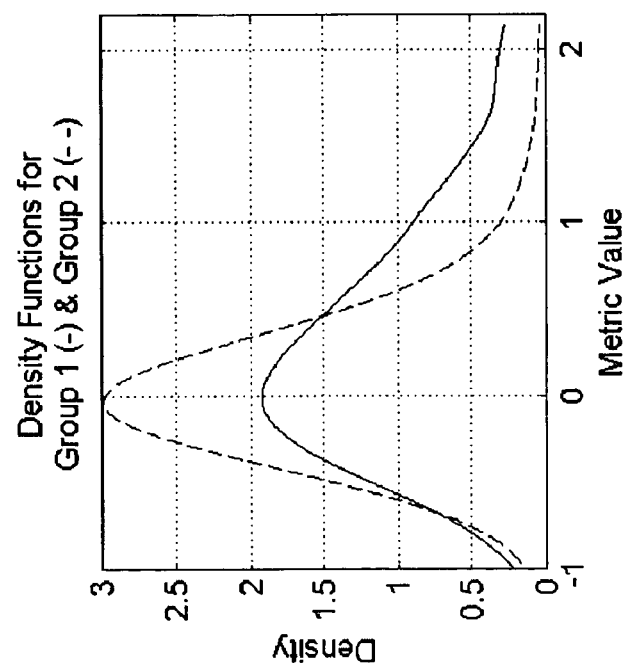
FIG. 2A shows univariate (one-variable) density functions for two embryo quality groups, respectively.
Figure 2D:
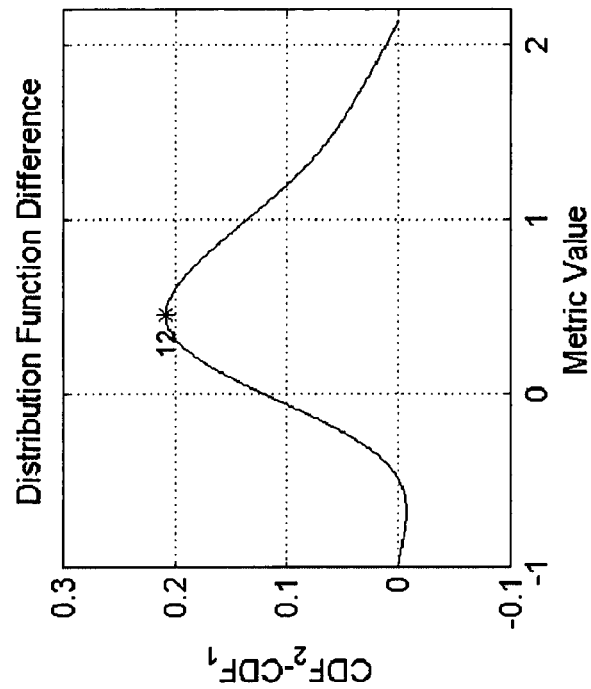
FIG. 2D shows the difference between the two cumulative distribution functions.
Figure 2C:
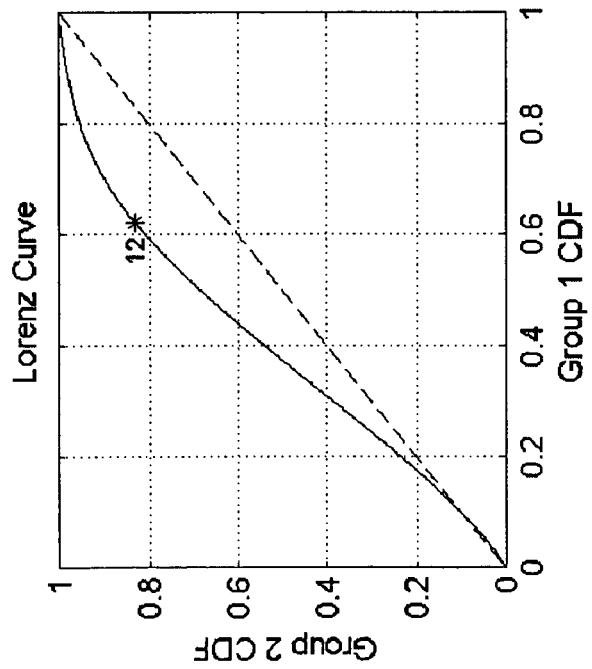
FIG. 2C shows a Lorenz curve plotting the two cumulative distribution functions of FIG. 2B against each other.

This process is schematically illustrated in FIGS. 2A-2D. FIG. 2A illustrates univariate (single-metric or single-variable) density functions for Group 1 (e.g., embryos of known high quality) and Group 2 (e.g., embryos of known low-quality), respectively. FIG. 2B illustrates the cumulative distribution functions for the same Groups 1 and 2, as in FIG. 2A. FIG. 2C illustrates plotting the two cumulative distribution functions for Groups 1 and 2 of FIG. 2B against each other to obtain a Lorenz curve, to obtain the balance point 12. Finally, FIG. 2D illustrates the distribution function difference, i.e., the difference between the two cumulative distribution function of Groups 1 and 2. Note that the balance point 12 corresponds to a point where the difference between the two cumulative distribution functions is the largest.

Lorenz curves are calculated for all types of metrics in this manner, and the metric values corresponding to the points farthest from the line y=x are defined as the threshold values for classifying embryos into two classes. For example, embryos having metric values equal to or less than a threshold value are classified into one embryo quality class and embryos having metric values greater than a threshold value are classified into another embryo quality class.

The multiple threshold values obtained in this manner are then combined using a Bayes optimal classifier. See Mitchell, T. M., *Machine Learning*, WCB/McGraw-Hill, pp. 174-176, 197, 222, 1997. A Bayes classifier, well known in the art, is essentially a large look-up table, in that it contains a complete list of all possible inputs and the corresponding classification for each input.

Specifically, the threshold values obtained from the Lorenz curves are used to assign binary codes (representing two possible quality classes, e.g., Y(1) and N(0)) to any metric values. For example, referring to FIG. 1D, each of the metric values A and B is divided into two groups at a respective threshold value, with one group assigned code Y and another group assigned code N. Thus, each embryo of known quality in the training set ("G" for good embryos and "B" for bad embryos) has metric values A and B corresponding to either code Y or code N. Referring to row 14 in FIG. 1D, a classification model is shown that if metric value A has a binary code Y and metric value B has a binary code Y, then two out of three embryos having these metric values are of high quality. Referring to row 16, another classification model is shown that if metric value A has a binary code Y and metric value B has a binary code N, then two out of two embryos having these metric values are of high quality. Classification models of this sort are made for all possible pairs, triplets, quadruples, etc., of metric values, depending on how many metrics are used. For a pair of metric values (or Lorenz curves), there are four binary combinations (YY, YN, NY, NN), as shown in FIG. 1D, and for three metric values, there are eight binary combinations, and so on. For 'k' metric values, there are $2^k$ binary combinations. Each binary combination is assigned an identity code, for example, l, m, n, and o in FIG. 1D.

For each embryo quality class (G or B), the conditional probability of observing each identity code (or a particular binary combination) is estimated. For example, following the example of FIG. 1D, the probability that good (high quality) embryos will have YY, YN, NY, or NN combination is 2/5, 2/5, 1/5, or 0, respectively, while the probability that bad (low quality) embryos will have YY, YN, NY, or NN combination is ¼, 0, 0, or ¾, respectively. Then, these probabilities are multiplied by the probability that each quality class occurs in all samples. For example, the probability that good embryos will have YY combination, 2/5, is multiplied by the probability that good embryos occur, 5/9 (five occurrences out of nine samples), to produce the probability of 2/9. This is the probability that an embryo having YY combination will be of high quality (belonging to the high quality class). Similarly, the probability that an embryo having YY combination will be of low quality is calculated as ¼×4/9=1/9. Because 2/9>1/9, an embryo having YY combination is more likely to belong to the high quality class. If two probabilities are the same, then either one of the two classes may be assigned randomly or based on other considerations such as economics.

The above described method of finding univariate Lorenz thresholds for multiple metrics and combining them using a Bayes classifier may be too time-consuming in some situations. For example, when the number of embryo samples available in a training set is large and/or the number of metrics is large, the method may take a long time to build a classifier because for each embryo data, all possible pairs, triplets, quadruples, etc., of metric values are calculated to eventually produce a single classifier. Further, the procedure uses linear boundaries to separate groups, whereas the boundaries are often nonlinear. With the recent advent of some very fast sparse matrix subroutines which also do accumulation and are commercially available (for example, Matlab available from The Mathworks), the calculation of multi-dimensional histograms can now be accomplished very quickly.

To overcome the above mentioned limitations and to take advantage of recent advances in sparse matrix handling subroutines, the present invention provides a generalized form of the Lorenz-Bayes method, which is also known as a Parzen classifier or Parzen-Bayes classifier, to classify embryos. Unlike the previously described method, in which several univariate metrics (or threshold values corresponding to respective Lorenz curves) are combined, the generalized Lorenz-Bayes method applies the Lorenz theorem to multivariate samples, i.e., embryo samples each associated with plural metric values, in each class of a training set. In other words, the method determines multivariate Lorenz thresholds from multivariate histograms.

In the one dimensional case, as in the previous method, cumulative distribution functions are very useful for finding the thresholds that separate the classes. In two or more dimensions, the cumulative distribution functions are no longer very useful, because there are an infinite number of directions in which to integrate the histogram. In the one dimensional case, the thresholds occur where the difference between cumulative distribution functions reaches a maximum distance from the line y=x. These points of maximum distance from the line y=x, correspond to places where the histograms or density functions cross each other. Uniformly minimum-variance unbiased estimators exist for cumulative distribution functions, but not for density functions. Thus, in the one dimensional case, it is best to find the threshold values for classifying embryos from the cumulative distribution functions. In two or more dimensions, these thresholds are no longer points of intersection but are curves in the 2-dimensional plane, curved surfaces in the 3-dimensional space, and hyperdimensional curved surfaces in higher dimensional spaces. Integrating the histograms or density functions in various directions to find points on these curves and surfaces is extremely inefficient and prone to error. Accordingly, the present invention proposes calculating the best estimates of the two density functions (one for each embryo quality class), and then comparing them by any suitable measure such as by taking the difference between the two, by taking the ratio of the two, by taking the logarithm of the ratio of the two, or by using logical comparisons wherein one checks to see which histogram or density function has a higher value for a particular set of input metric values. Any other measure of comparing the two density functions may also be used, as will be apparent to one skilled in the art. In the present description, smoothed multi-dimensional histograms are used to best estimate the underlying density functions of data, though other methods may also be used to estimate or represent the density functions, as will be apparent to one skilled in the art. The smoothed multi-dimensional histograms are used because of the speed with which they can be calculated, which greatly facilitates the speed with which thousands of combinations of metrics can be searched for good classifiers.

Figure 3A:
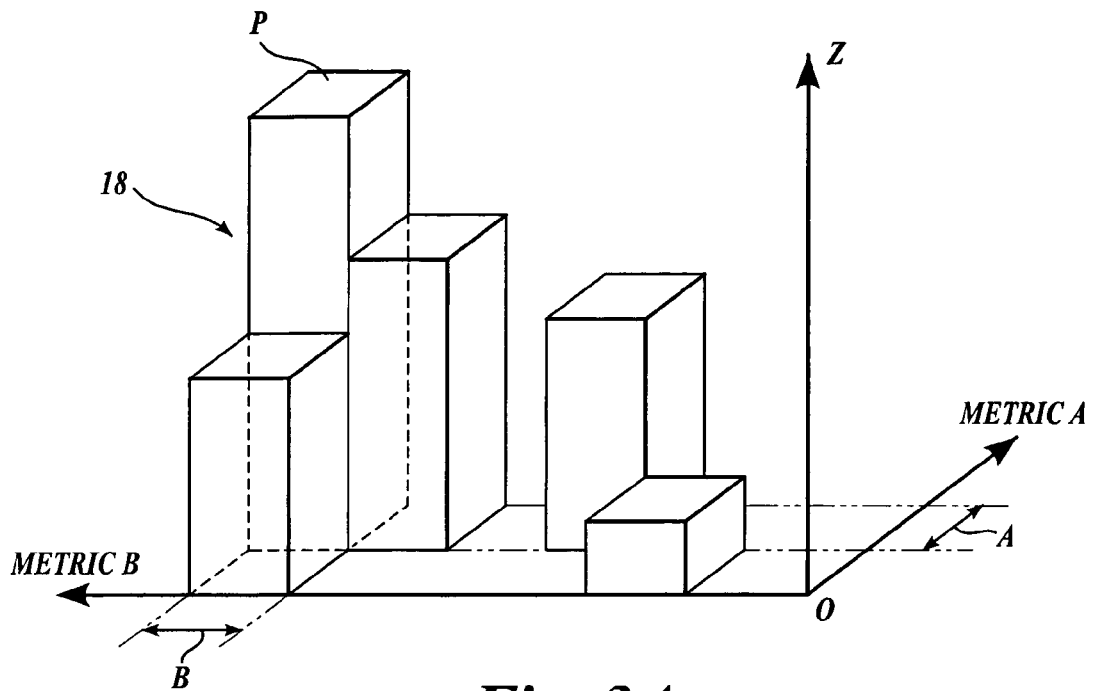
FIGS. 3A and 3B illustrate the concept of multivariate histograms (representing multivariate density functions) of embryos of two known quality classes, respectively.
Figure 3B:
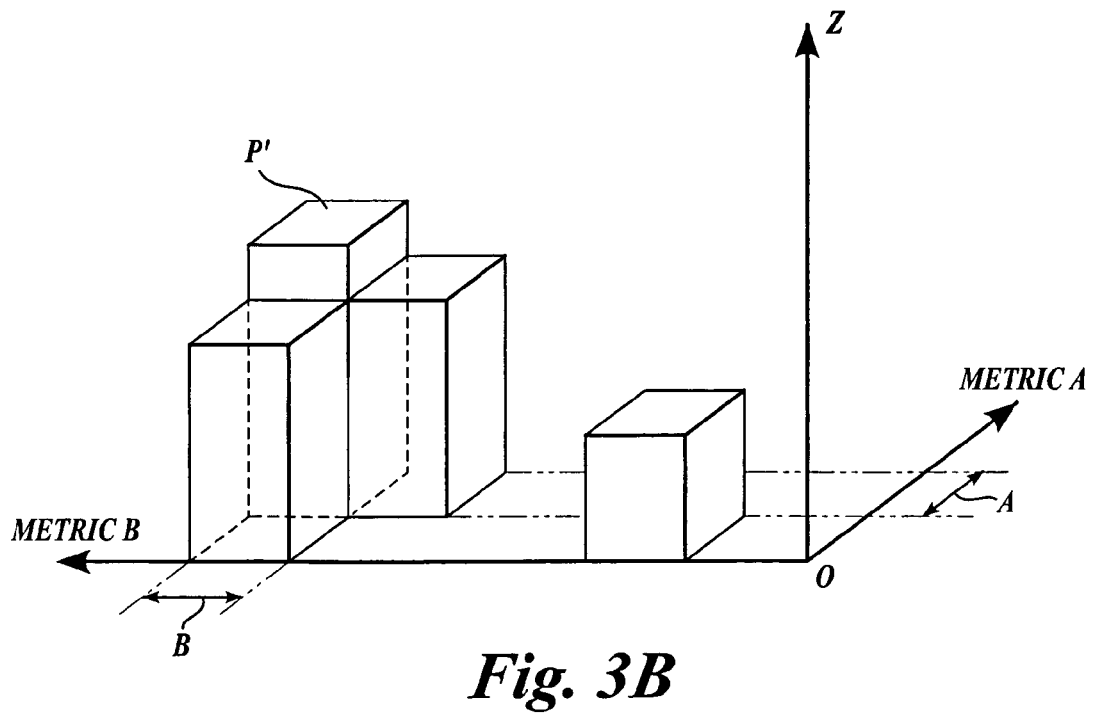

Multi-dimensional histograms (or density functions) are generated by binning the multiple metrics to be used to create the multi-dimensional histograms and counting the number of feature vectors (or sets of metrics) falling into each of the possible bins. For example, referring to FIG. 3A, a multivariate histogram 18 based on two variables (or metrics A and B) for a set of high-quality embryos in a training set is shown. The counts of feature vectors falling into each bin are graphically represented as the height of each column corresponding to the bin. For example, value "P" along the z direction in FIG. 3A represents the number of feature vectors having metric A value in the range of "a" and metric B value in the range of "b". Referring to FIG. 3B, a similar multivariate histogram is prepared, this time for a set of low-quality embryos, wherein value P' represents the number of feature vectors having metric A value in the range of "a" and metric B value in the range of "b."

These counts per bin are turned into fractions by dividing them by the total number of feature vectors. The resulting histogram is a crude estimate of the underlying density function. The histogram is usually smoothed using a Gaussian, uniform, or combined kernel function (see Keinosuke Fukunaga, *Statistical Pattern Recognition*, Academic Press, 1990). Other kernels can be used, but these work the best in higher dimensions. Other methods of estimating the density function or smoothed histogram are also available, as will be apparent to one skilled in the art. These include, but are not limited to, the k-nearest neighbor density estimator, the Parzen estimator, fitting a mixture of Gaussian distributions to the data and interpolating the surface (the fitting of the mixture distribution can be done by some method such as radial basis functions or the EM algorithm), nonlinear least-squares, etc. The point is to obtain, by some method, estimators of the multi-dimensional density functions which yield the best possible classifications.

While FIGS. 3A and 3B illustrate a simple case including only two variables (two metrics) for the purpose of visual presentation, it should be understood that histograms may be prepared in any n-dimensional space, wherein the coordinates of point P are (p1, p2, ..., pn) and the coordinates of point P' are (p'1, p'2, ..., p'n). The universal n-dimensional space is divided into many n-dimensional unit hyper cubes. (In the example of FIGS. 3A and 3B, the space can be divided into three-dimensional unit hyper cubes, each hyper cube having the size of (1×1×1).)

Then, two multivariate histograms of the two classes are compared by calculating a "comparison value," which is indicative of the relation between the two histograms, or the distance between n-dimensional P point in one class and corresponding n-dimensional P' point in another class. For example, a comparison value can be obtained by taking the difference between the two, by taking the ratio of the two, by taking the logarithm of the ratio (log-ratio) of the two, or by using logical comparisons. Any type of comparison value is classifiable into at least two groups. For example, when a difference or a log-ratio is used as a comparison value, it can be either a negative value, a positive value, or zero. Providing the "zero" category is preferred so as to avoid division by zero or by very small numbers. Zero differences occur when the densities are equal, and therefore such instances can be assigned to the class that minimizes some other criteria such as the cost of misclassification. The logarithm of the ratio of the density functions is positive where the difference is positive, negative where the difference is negative, and zero where the densities are equal, so classification by comparing the histograms or density functions by the logarithm of the ratio of the densities is the same as for the difference. The ratio of the densities will have a value greater than 1 where the difference is positive, a value less than 1 where the difference is negative, and a value of 1 where the densities are equal. Ratios greater than 1 are assigned to one class, while rations less than one are assigned to the other class. Ratios of 1 are treated the same as zero differences or zero log-ratios. If logical comparisons are used, then the embryo is assigned to the class (true or false) corresponding to the largest density value. Equal density values are treated as in the zero difference case.

Figure 4D:
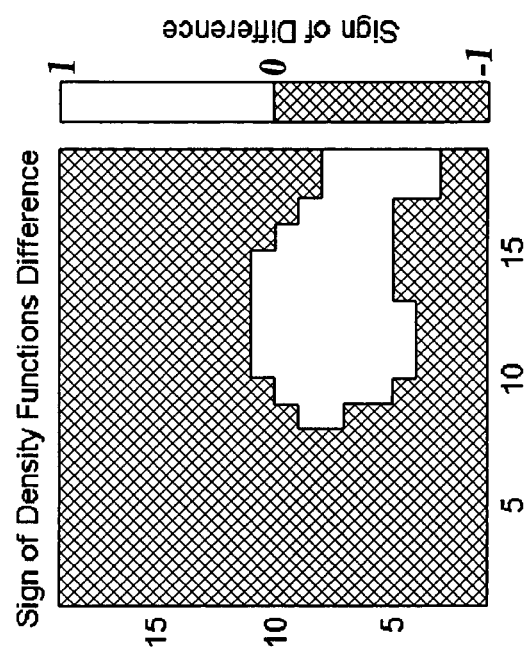
FIG. 4D illustrates the sign of the difference between the two density functions as shown in FIG. 4C.
Figure 4C:
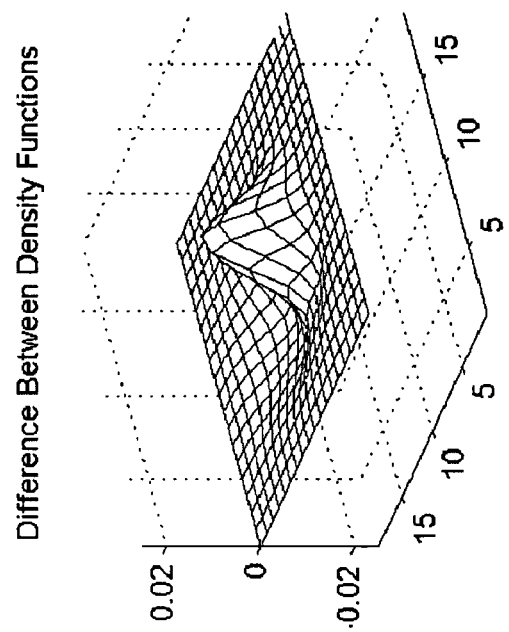
FIG. 4C illustrates the difference between the two density functions of FIGS. 4A and 4B.

When a difference is used as a comparison value, any new embryo is classified by finding the location of its metrics in the difference between the histograms. If the corresponding difference is positive, the embryo is assigned to one class, if negative, it is assigned to the other class. Also, if the corresponding difference is zero, the embryo can be assigned to the class which minimizes some other criteria, such as costs. For example, referring to FIG. 3C, nine multivariate embryo samples (having certain metric A and metric B values) are divided into two groups according to this method, with one group assigned code Y and another group assigned code N. Thus, each embryo of known quality in the training set ("G" for good embryos and "B" for bad embryos) is assigned a multivariate code of either Y or N (or identity code l or m). This process is schematically illustrated in FIGS. 4A-4D. FIGS. 4A and 4B illustrate bivariate (two-variables) density functions for Group 1 (e.g., embryos of known high quality) and Group 2 (e.g., embryos of known low-quality), respectively. FIG. 4C illustrates the difference between the two density functions of FIGS. 4A and 4B, and FIG. 4D illustrates how the difference (or the sign of the difference, being positive or negative) as illustrated in FIG. 4C is distributed. Any new embryo is classified by finding its metric-location in the differences (negative or positive) as shown in FIG. 4D. Similarly, when other types of comparison values are used, any new embryo is classified by finding the location of its metrics in the particular comparison value used to indicate the relation between the two histograms (or density functions).

Before making the comparison, the histograms or density functions can be multiplied by weights, which reflect the importance of other considerations such as costs associated with misclassifying an embryo. Typically the weights are fractions between 0 and 1. Often, but not always, the sum of the weights is equal to 1. If no weights are used, then one is implicitly using equal weights, which in the two-class case is the same as multiplying the histograms by 0.5. These weights can reflect the prior proportions of the high-quality and low-quality embryos, the costs of processing the embryos when they are misclassified, or some other criteria such as, but not limited to, the embryos' disease and drought resistance. In short, the weights allow the classifier to be adjusted to produce classifications which are better economically.

It should be understood that, in some applications of the present method, some intermediate classifiers may be developed from the acquired image or spectral data divided into two classes, before a final classifier for classifying embryos into two classes is obtained. For example, in some cases, more than two clusters (or clumps) will naturally occur in the data and it is easier to classify new embryo data into one of these clusters and then to classify the cluster or portions of the cluster to a quality group. For example, suppose 5 clusters are found in the data. New embryo data can be classified into one of these clusters. The cluster and/or parts of the clusters can then be classified into either the high embryo quality group or the low embryo quality group. In the example given above, perhaps clusters 1, 2 and 5 are classified as high embryo quality and clusters 3 and 4 are classified as low embryo quality.

Thereafter, as before, a Bayes theorem may be applied to produce a single classifier. Specifically, for each embryo quality class (G or B), the conditional probability of observing each multivariate code Y or N is calculated. The probability that good (high quality) embryos will have code Y or N is 4/5 or 1/5, respectively, while the probability that bad (low quality) embryos will have code Y or N is ¼ or ¾, respectively. These probabilities are then multiplied by the probability that each quality class occurs in all samples. Accordingly, the probability that good embryos will have code Y, 4/5, is multiplied by the probability that good embryos occur, 5/9 (five occurrences out of nine samples), to produce the probability that an embryo having code Y will be of high quality, 4/9. Similarly, the probability that an embryo having code Y will be of low quality is calculated as ¼×4/9=1/9. Because 4/9>1/9, an embryo having code Y is more likely to belong to the high quality class. Again, while the above described example involved only two metrics for the purpose of clarity, this generalized Lorenz-Bayes method can be applied in any n-dimensional space having any number of metrics. As before, the difference or some other measure of comparison between multivariate histograms is calculated for each of various combinations of metrics (e.g., pairs, triplets, quadruples, etc., of metric values).

As is well known in the art, any classification model needs to be tested to verify its performance. Usually, this is done by excluding some of the data from the training set of the classification model, and using the model to classify the excluded data and calculating how well the model did. Several methods are described in the literature for performing such tests, as well known in the art. For example, one method repeatedly and randomly splits the original data into a training set and a test set to repeat the testing process. Alternatively, all the data can be used to train the model and new data are collected and classified by the model. The results are then checked to see how well the model did.

This method is a generalized version of the Lorenz-Bayes method previously described, and includes the previously described method as a special case. Unlike the previous method in which several univariate metrics (or threshold values corresponding to respective Lorenz curves) are calculated and combined, the generalized Lorenz-Bayes method applies the Lorenz-Bayes concept to multivariate samples to determine multivariate Lorenz thresholds from multivariate histograms. Thus, the generalized method greatly speeds up the process of finding a good classifier, and permits more rigorous testing of the accuracy of the derived classifier (by speeding up the process of repeatedly splitting the training set into a training subset and a test set so as to derive a classifier that consistently classifies the most embryos correctly.) With this generalized method, millions of classification models involving numerous possible combinations of metrics can be rapidly checked to find better models (or classifiers). Furthermore, the generalized method allows nonlinear boundaries between groups, unlike the previously described Lorenz-Bayes method that uses only linear boundaries, and thus is capable of finding better classification models.

Most prior classification methods are based on the principle of finding a set of statistics that maximizes the distance between groups, such as the geometric distance between group centers or group members. These methods fail to yield a "good" classifier when one or more of the groups is divided into unconnected subgroups, or the boundary between the groups is highly nonlinear as in the case where one group partially or completely surrounds the other group. Also, data that have extreme values cause distance-based methods to fail. Statistics calculated from images or spectral data of embryos commonly have many extreme values and the boundaries are often not linear.

In contrast, the generalized Lorenz-Bayes method of the present invention is based on the principle of finding the boundary which best separates the distributions of two groups. Instead of finding a classification model that physically separates the groups, the method finds a classification model which separates the probability distributions. This is a more general approach, and still works even when the distributions completely overlap each other but differ in how they spread out.

The present method is preferably implemented using software (computer program) running on a computer to perform the steps of the method. A suitable selection of a computer and coding of the program to carry out the steps of the method would be apparent to one skilled in the art.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of classifying plant embryos according to their germination potential, comprising the steps of:
   (a) acquiring image or spectral data from plant embryos of known germination potential;
   (b) dividing the acquired image or spectral data from embryos of known germination potential into two classes according to their known germination potential;
   (c) calculating metrics based on the acquired image or spectral data in each class;
   (d) calculating multi-dimensional density functions for multiple metrics per each class;
   (e) comparing the two multi-dimensional density functions calculated in step (d) by calculating a comparison value that is indicative of the relation between the two density functions, the comparison value being classifiable into at least two groups;
   (f) acquiring image or spectral data from a plant embryo of unknown germination potential and calculating metrics based on the acquired image or spectral data from the embryo of unknown germination potential; and
   (g) if the metrics of the embryo of unknown germination potential correspond to a comparison value of one group as calculated in step (e), assigning the embryo into one germination potential class, and if the metrics of the embryo of unknown germination potential correspond to a comparison value of another group as calculated in step (e), assigning the embryo into another germination potential class.

2. The method of claim 1, further comprising the step of multiplying the two density functions by weights between step (d) and step (e).

3. The method of claim 1, wherein more than two intermediate classifiers are developed in step (e).

4. The method of claim 1, wherein the comparison value comprises a value selected from the group consisting of the difference, ratio, log ratio, and logical comparison between the two multi-dimensional density functions.

5. The method of claim 1, wherein the image or spectral data are digitized.

6. The method of claim 1, wherein steps (d) through (g) are repeated for each of plural combinations of metrics.

7. The method of claim 1, wherein steps (d) through (g) are repeated and resulting classifiers from each of the repetitions are combined using a Bayes classifier.

8. The method of claim 1, wherein the image or spectral data are obtained from more than one view of each plant embryo.

9. The method of claim 1, wherein the plant embryo is a plant somatic embryo.

10. The method of claim 1, wherein the plant is a tree.

* * * * *